United States Patent [19]
Dewitz

[11] Patent Number: 5,143,521
[45] Date of Patent: Sep. 1, 1992

[54] METHOD FOR PRODUCING GAS USING ENERGY RECOVERING COAL FEEDING STEPS

[75] Inventor: Thomas S. Dewitz, Houston, Tex.

[73] Assignee: Shell Oil Company, Houston, Tex.

[21] Appl. No.: 700,276

[22] Filed: May 15, 1991

Related U.S. Application Data

[62] Division of Ser. No. 588,892, Sep. 27, 1990, Pat. No. 5,017,196.

[51] Int. Cl.$^5$ ............................................. C10J 3/46
[52] U.S. Cl. .................................... 48/210; 48/206; 48/DIG. 4; 406/120
[58] Field of Search ................. 48/197, 202, 203, 206, 48/209, 210, DIG. 3, DIG. 4, 86 R, DIG. 2; 414/201, 204, 205, 217, 218, 221; 252/373; 406/120

[56] References Cited

U.S. PATENT DOCUMENTS

| | | | |
|---|---|---|---|
| 3,963,426 | 6/1976 | Hand | 48/206 |
| 4,017,272 | 4/1977 | Anwer et al. | 48/206 |
| 4,033,730 | 7/1977 | Baron et al. | 414/201 |
| 4,350,103 | 9/1982 | Poll | 110/264 |
| 4,381,897 | 5/1983 | Arbeletche et al. | 406/120 |
| 4,458,607 | 7/1984 | Schoeber et al. | 110/347 |
| 4,728,250 | 3/1988 | Wilhelm et al. | 414/221 |
| 4,799,356 | 1/1989 | Doering | 60/648 |
| 4,838,898 | 7/1989 | Mifflin et al. | 48/210 |
| 4,936,870 | 6/1990 | Baumann et al. | 48/197 X |

FOREIGN PATENT DOCUMENTS 0683965 9/1979 U.S.S.R. ............................ 406/120

*Primary Examiner*—Peter Kratz

[57] ABSTRACT

A method for gasifying coal is disclosed. Coal is fed to the gasifier using lockhoppers which are in fluid communication with each other. Energy is recovered during depressurization steps by passing gas through a pressure recovery device such as a turbo-expander.

5 Claims, 3 Drawing Sheets

METHOD FOR PRODUCING GAS USING ENERGY RECOVERING COAL FEEDING STEPS

This is a division of application Ser. No. 5,88,892, filed Sep. 27, 1990, now U.S. Pat. No. 5,017,196.

BACKGROUND OF THE INVENTION

The invention relates to a process for the partial combustion of a finely divided solid fuel, such as pulverized coal, in which the latter is introduced together with oxygen-containing gas via a burner into a reactor or gasifier from which a stream of high-temperature raw synthesis gas is discharged together with a minor amount of contaminating material, most of which is in the form of particles of fly ash.

Partial combustion is the reaction of all of the fuel particles with a substoichiometrical amount of oxygen, either introduced in pure form or admixed with other gases, such as a transport stream of nitrogen, whereby the fuel is partially oxidized to predominantly hydrogen and carbon monoxide. This partial combustion differs from complete combustion wherein the fuel would be completely oxidized to carbon dioxide and water.

During the process of partial combustion of pulverized coal in a gasifier, the mineral matter in the coal splits into two streams when the coal is gasified. Molten slag which is formed falls to the bottom of the gasifier where it is discharged. Lightweight particles of fly ash or fly slag which also are formed are carried out through the top of the gasifier by the stream of synthesis gas which is piped through a quench section and thence to a gas cooler, heat exchanger or waste heat boiler where steam may be generated.

The product gas and fly ash pass through equipment at high pressures, say 300 to 350 psig for example. The fly ash must then be separated from the product gas, collected, depressurized, purged of product and/or toxic gases, cooled, and converted to a form for easy disposal.

An essential component of this process is a means for repeatedly isolating the particulate solids container, i.e., a lock hopper, for filling and emptying. Thus the lock hopper is (a) raised to an elevated pressure, e.g., 350 psig, and filled; (b) depressurized to transfer pressure; (c) emptied of particulate contents, then (d) isolated (purged) for repressurization, refilling and a repeat of the process. The depressurization and purging is generally performed at or near ambient pressure, i.e., the tank is vented to atmosphere thereby wasting this energy and material.

To conserve some of the stored energy and improve efficiency, a dual lock hopper arrangement is sometimes used, as in Assignee's pilot plant, wherein one lock hopper (filled and at high pressure) is purged into the second (empty, low pressure) lock hopper thereby equalizing the pressures. The first lock hopper is then isolated, depressurized to transfer pressures and the particulate contents emptied to a receiver. After emptying, the first lock hopper is purged to atmosphere for a repeat of the refilling process. After being equalized, the second hopper is further pressurized, filled, purged into the first hopper (thereby equalizing pressures), isolated, depressurized and emptied to the receiver. This process repeats itself when the second lock hopper is empty and thus utilizes some of the stored energy which otherwise would be wasted (as in a single lock hopper). The dual lock hopper system, while reducing the wasted energy, still must purge to atmosphere the residual (pressure-equalized) pressure thereby wasting the stored energy during and after pressure equalization. This process is referred to as "cross-pressurization." The present invention improves upon the prior art by utilizing at least a portion of this otherwise wasted energy.

SUMMARY OF THE INVENTION

The present invention is directed to a process for the partial combustion of finely divided carbonaceous fuel containing at least 1% by weight ash in a reactor or gasifier to produce a product gas (mainly carbon monoxide and hydrogen) which carries along with it, as it leaves the reactor, sticky particles of fly ash or fly slag, or ash-forming constituents which may consist of alkali metal chlorides, silicon and/or aluminum oxides. At the temperature prevailing in the reactor, the ash is usually sticky. In particular, when the partial combustion takes place by entrained gasification in the burner flame, the residence time in the gasifier or reactor is very short compared with gasification in a fluidized or moving bed process, and the temperature and pressure is very high.

The fly ash that is formed during the gasification process is at least partly in liquid form at the conditions that prevail in the reactor, usually at temperatures from 2000° F. to 4000° F. If the ash particles are not fully in liquid form, they will generally consist at least partly of a molten slag or be a combustion product or residue having a partly molten consistency. The high temperature of a reactor is sufficient to vaporize certain organometallic by-products which may assume a sticky or solid form when cooled in the process equipment.

In the present invention, a long straight quench section of pipe is provided which forms the first section of the discharge duct from the reactor. The temperature of the product gas at this point may be, say, 2600° F. for example. A stream of product gas, which has been cooled several hundred degrees, is recycled from a selected point in the process and injected as a quench gas into the upstream end of the quench section of the reactor discharge duct. By mixing the cool quench gas with the hot reactor effluent as it enters the quench section, and flowing the mixture through a preferably straight quench section of sufficient length, the hot synthesis product gas and the sticky particles carried thereby are thoroughly mixed with the cooler quench gas, allowing the molten or sticky particles of fly ash to "freeze" to the extent that they do not stick to the walls of any downstream equipment or piping.

The "frozen" fly ash must be periodically discharged for disposal and requires pressure transitions from the very high operating pressures (350 psig) to atmospheric. To conserve energy and improve efficiency, lock hoppers are utilized for isolating the various operating pressures of the system. Cross-pressurization in a dual lock hopper arrangement conserves some of the energy by using the isolated, stored energy (pressure) of one lock hopper to partially pressurize (equalize) the pressure in the second which is then isolated and pressurized to operating pressure for refilling. The pressure remaining in the first lock hopper is then vented to atmosphere. The instant invention utilizes this otherwise wasted energy by directing it to other devices such as venturi eductors, turbines, compressors, blowers, etc. which can utilize this energy.

An object of the present invention is to provide a coal gasification process in which the unwanted fly ash in the high-pressure, high-temperature system can be readily and efficiently separated from the product gas on the high pressure side of the system, then depressurized, purged of any toxic gases and cooled prior to disposal in a dual lock hopper process which enhances energy recovery. In a similar manner, the invention may be applied to a coal feed system utilizing dual lock hoppers which supply coal to the burners of the gasifier. The recovered energy may be used to power a compressor, for example, which supplies additional gaseous fluids for fluidizing the particulate coal which feeds the burners.

Accordingly, the invention is designed for use in a synthesis gas generation complex comprising:

a) a coal gasification plant, including at least one gasifier or reactor for the gasification of coal to produce synthesis gas at a temperature of 2000° F. to 3000° F., the gasifier having heat exchange surfaces adapted for indirect heat exchange with steam and water and preferably comprising a burner section having at least one burner adapted to utilize dry particulate coal which is mixed with oxygen;

b) A long straight cooling or quench section or conduit mounted at the gas discharge port of the gasifier and in flow communication therewith whereby a quenching gas of lower temperature may be injected into and mixed with the hot effluent synthesis gas and the fly ash carried thereby;

c) a heat exchange section comprising at least one heat exchanger in gas flow communication with said gasifier, said heat exchanger being adapted to further cool the gas and the fly ash carried thereby;

d) a gas cleanup section in flow communication with said heat exchanger including a gas/fly ash separator for removing substantially all of the fly ash from said synthesis gas;

e) a source of quenching gas at reduced temperature and reduced particle content for recycling back to the quench section;

f) means for accumulating a batch of fly ash under high pressure conditions;

g) means for depressurizing the batch of fly ash;

h) means for producing useful work during, and as a result of, said depressurizing;

i) means for sweeping or purging all toxic gases from the low pressure fly ash; and j) means for cooling and disposing of the fly ash.

The invention relates to a process for the production of synthesis gas comprising:

a) partially oxidizing coal at an elevated temperature by feeding dry particulate coal and oxygen to a gasification zone, the gasification zone preferably comprising at least one burner for oxidizing the coal, the ratio of coal to oxygen being such as to maintain a reducing atmosphere, and producing raw synthesis gas having a temperature of from about 2000° F. to about 3000° F., and removing heat from said synthesis gas in said gasification zone by indirect heat exchange with steam and water;

b) passing raw synthesis gas and the fly ash particles carried thereby through a long straight quench chamber formed at the upstream end of the discharge duct from said gasification zone;

c) injecting a cooling quenching gas into said quench chamber and mixing the cooling quenching gas with the hot synthesis gas to cool the gas and the particles;

d) passing raw synthesis gas from step (c) to a heat exchange zone of any suitable cooler well known to the art and removing heat from said synthesis gas and the fly ash carried thereby;

e) removing fly ash from the raw synthesis gas in a high pressure environment to produce a synthesis gas substantially free of fly ash, a portion of the gas being adapted to be re-cycled back to and injected into the quench chamber;

f) depressurizing the separated fly ash in a batchwise manner to substantially atmospheric pressure;

g) converting the depressurizing energy to useful work;

h) purging each batch of fly ash of any residual synthesis gas or toxic gas in a continuous manner, and i) cooling the fly ash to between 100° F. to 200° F. prior to disposal of the fly ash.

DETAILED DESCRIPTION OF THE INVENTION

Figure 1:
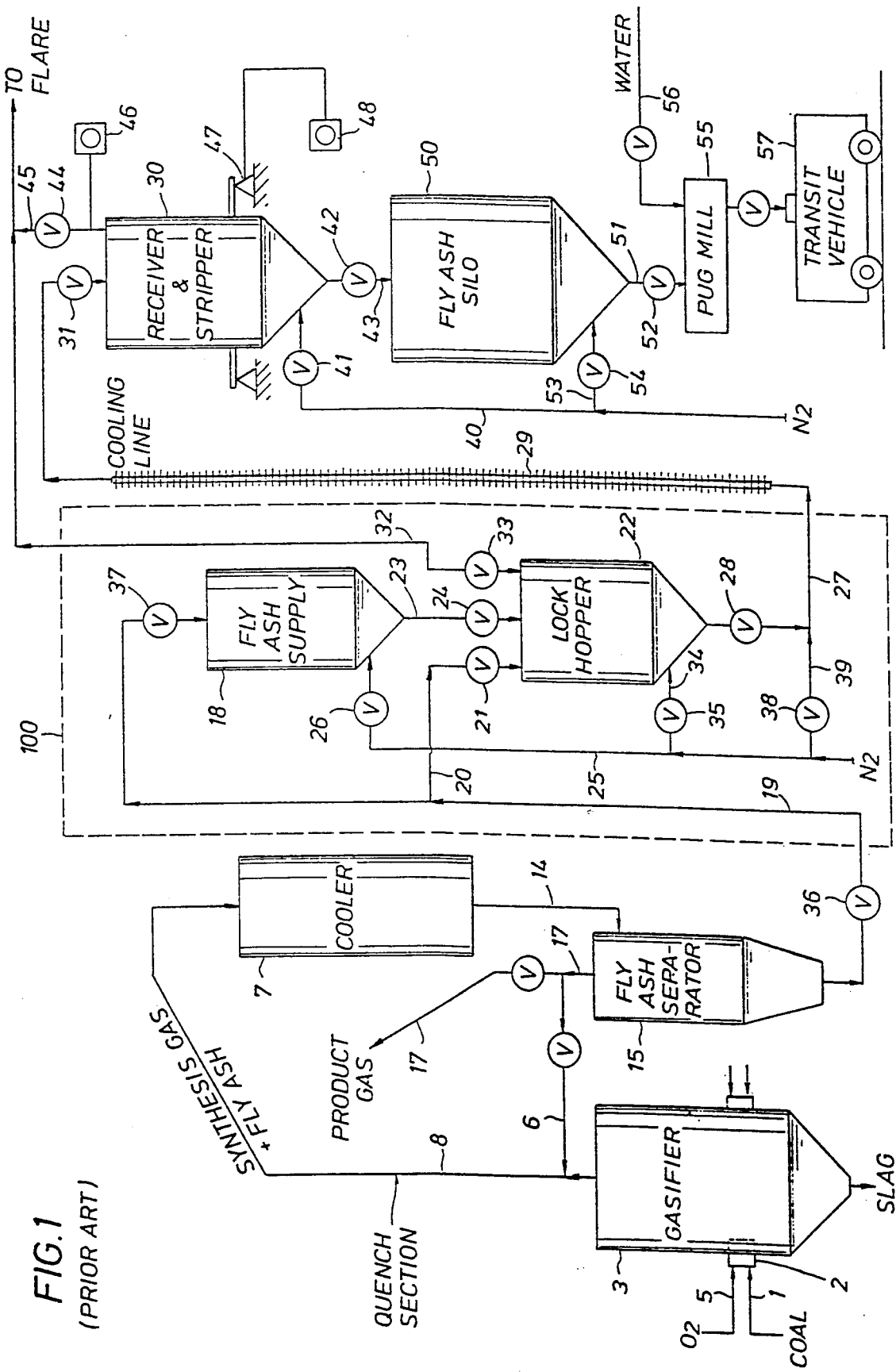
FIG. 1 is a schematic flow diagram of the prior art.

The gasification may be carried out utilizing techniques suitable for producing a synthesis gas having gasifier outlet temperature of from about 2000° F. to about 3000° F., preferably 2350° F to about 2550° F. Although some fluidized bed oxidizers are capable of producing such gas temperatures under the conditions mentioned herein, the process is preferably carried out with a gasifier comprising at least one burner. Such a process will preferably include combustion, with oxygen, of dry particulate coal, i.e., coal having less than about 10 percent water content. Steam may be added in some instances to assist in the combustion. The type of coal utilized is not critical, but it is an advantage of the invention that lower grade coals, such as lignite or brown coal, may be used. If the water content of the coal is too high to meet the requirements mentioned, supra, the coal should be dried before use. The atmosphere will be maintained reducing by regulation of the weight ratio of the oxygen to moisture and ash-free coal in the range of about 0.6 to 1.0, preferably 0.8 to 0.9. The specific details of the equipment and procedures employed for gasification form no part of the invention, but those described in U.S. Pat. Nos. 4,350,103, 4,458,607, and 4,799,356, all of which are incorporated herein by reference, may be employed. In view of the high temperatures required, however, suitable structural materials, such as the Inconels and Incoloy 800, i.e., high chrome-molybdenum steels, should be employed for superheating duty for long exchanger life. By carrying out the preferred procedure described herein, or utilizing the preferred structural aspects mentioned, as described, a synthesis gas stream is produced free of fly ash particles.

The essence of the present invention is to provide a novel method of removing and disposing of the tons of hot fly ash produced at a high temperature and pressure during the above-described synthesis gas process while maximizing efficiency. More particularly, the invention is directed to separating fly ash from synthesis gas at pressures of, say, 300 psig or more, reducing pressure to substantially atmospheric while utilizing the stored (and otherwise wasted) energy to produce useful work, detoxifying the fly ash and cooling it for disposal. A preferred alternate embodiment utilizes this recovered energy in the coal feed system itself.

In order to disclose the invention more fully, reference is made to the accompanying drawing. The drawing is a schematic representation of the process flow type, and illustrates the efficient integration of the specialized gasifier with equipment for substantially eliminating the particles of fly ash that are produced in a gasifier and the subsequent treatment of the fly ash. All values specified in the description relating thereto hereinafter are calculated, or merely illustrative.

Accordingly, FIG. 1 discloses a prior art process and apparatus as described in Assignee's U.S. Pat. No. 4,838,898, in which dry particulate coal (average particle size about 30 to 50 microns and moisture content of less than about 10 percent by weight) is fed via line 1 to burners 2 of gasifier 3. Gasifier 3 may be a vertical oblong vessel, preferably cylindrical in the burner area, with substantially conical or convex upper and lower ends, and is defined by a surrounding membrane wall structure (not shown) for circulation of cooling fluid. Preferably, the generally cylindrical reactor wall will comprise a plurality of heat exchange tubes, spaced apart from each other by "membranes" or curved plates, the tubes being connected at their extremities for continuous flow of a heat exchange fluid, such as water, and also having multiple inlets/outlets for the fluid, in a manner well known to the art. Concomitantly, oxygen is introduced to the burners 2 via line 5, the weight ratio of oxygen to moisture and ash-free coal being about 0.9, for example. The combustion produces a flame temperature of about 4000° F., with a gas temperature at the outlet of the gasifier being about 2300° F. to about 2600° F. Regulation of gasifier and outlet temperature is assisted by coolant in the membrane wall structure.

Hot raw synthesis gas leaves gasifier 3 through a straight elongated quench line 8 of selected length the interior of which forms a quench chamber in which the raw synthesis gas and the fly ash and impurities carried thereby are quenched, preferably by cooler synthesis gas through line 6 from any suitable point in the process. The quench gas may be from 300° F. to about 1000° F. The quenched gas then passes to a cooler or heat exchanger 7. Heat exchanger 7 is preferably a multiple section exchanger, the quenched synthesis gas being cooled by fluid in the tubes, and operates at substantially the same pressure as the gasifier.

The raw synthesis gas, now cooled in the low temperature section of heat exchanger 7 to a temperature of from about 600° F. to : about 300° F., passes via line 14 to a cleanup section 15 which may be in the form of a cyclone separator for removing fly ash particles. The details of the gas cleanup after fly ash has been removed form no part of the invention.

The dry solid fly ash separated from the synthesis gas in the cyclone or fly ash separator 15 is discharged to a high pressure fly ash accumulator or supply vessel 18 via line 19. The accumulator 18 may be a separate vessel displaced a distance from the cyclone separator 15, as illustrated. Alternatively, the bottom of the cyclone 15 may be designed as an accumulator in which case the fly ash. would be discharged from the bottom of the cyclone 15 through line 19 and by-pass line 20, through open valve 21 into a pressure-isolatable lock hopper 22.

In the system illustrated in the drawing, the accumulator 18 is connected via line 23 and valve 24 to lock hopper 22. The lock hopper 22 is employed as a depressurizing chamber between the high pressure side of the fly ash handling system and the low pressure side which is downstream of the lock hopper 22. In normal operation, the fly ash in accumulator 18 may be at a pressure of 300 psig or more when the valve 24 in the discharge line 23 is opened so that a preselected amount of fly ash can drop or be conveyed into the top of the lock hopper 22 which is charged with a gas, such as nitrogen, to substantially the same pressure as the accumulator 18. If the fly ash cannot be dropped by gravity into the lock hopper 22, a transport gas such as nitrogen is injected, as through line 25 and valve 26. Injecting gas into the bottom of the accumulator 18, as well as the rest of the vessels in the system, helps to fluff up the fly ash in the vessel and break it loose from the cone-shaped bottom of the vessel.

The lock hopper 22 is provided with a discharge or transfer line 27 with a discharge valve 28 through which a charge of fly ash from the lock hopper 22 is transported to the top of a fly ash receiver and stripper vessel 30 through valve 31. The discharge line is preferably elongated, say, from 100 to 300 feet long, and is provided with heat-dissipating fins 29 to aid in cooling the fly ash before it gets to the stripper vessel 30. The temperature of flowing fly ash in a nitrogen carrier fluid can be reduced 100° F. to 150° F. with 5 seconds of residence time in a 200-foot transfer line 27. The lock hopper 22 is also provided with a vent line 32 and valve 33 whereby the lock hopper can be depressurized from its high pressure mode to its low pressure mode at substantially atmospheric pressure. The lock hopper 22 is also provided with a nitrogen supply line 34 having a valve 35 therein and being connected to a nitrogen supply source.

In the operation of the lock hopper 22, with the hopper empty, valves 21, 24, 28 and 33 are closed prior to opening valve 35 in the nitrogen supply line 34. Valve 35 is opened and the empty lock hopper 22 is charged to a pressure substantially equal to that of the accumulator 18, say, 340 psig. Valve 35 is then closed and fly ash supply valve 24 is opened and a predetermined amount of fly ash is dropped into the lock hopper. If there is not sufficient fly ash in the lock hopper at that time, valves 36 and 37 in the fly ash supply line 19 would be opened until sufficient fly ash had been received in the lock hopper 22.

In order to change the lock hopper 22 from its high pressure mode, say, 340 psig, to its low pressure mode, supply line valve 24 would be closed and vent valve 33 would be opened to bleed the gas through line 32 until the lock hopper is substantially at atmospheric pressure, say, 5 psig. The gas or gases from line 32 are preferably sent to a flare (not shown). At this point, the fly ash discharge valve 28 is opened together with valve 38 in the nitrogen supply line 39 whereby nitrogen under reduced pressure, say, 30 psig, is used as a transfer fluid to convey fly ash to the stripper 30 through the pneumatic conveyor line 27. With the entire charge of fly ash transferred from the lock hopper 22 to the stripper 30, valves 33 and 28 are closed and valve 35 in the nitrogen supply line is opened to a high pressure nitrogen source to pressure up the lock hopper to its high pressure mode. With the pressures within the lock hopper 22 and the accumulator 18 substantially equal, the operation of the lock hopper is repeated with a second charge of fly ash.

It is to be realized that as a batch of fly ash moves from the accumulator 18 to the lock hopper 22 and thence on to the stripper 30, a minor amount of synthesis gas is carried by, entrained with, or adsorbed on the body of fly ash. To remedy this undesirable situation and to detoxify the body of fly ash, a continuous flow of low pressure nitrogen flows through line 40 and open valve 41, into the bottom of the stripper vessel 30 and up through the body of fly ash in the vessel 30. At this time the inlet valve 31 is closed and a fly ash discharge valve 42 in discharge line 43 is closed.

The flow of nitrogen up through the body of fly ash in the stripper 30 strips the synthesis gas from the fly ash with the gases being discharged through an open valve 44 in a vent line 45 from the top of the stripper. The carbon monoxide content of the gases vented through line 45 is preferably measured and monitored by a carbon monoxide analyzer and recorder 46 of any type well known to the art. When the carbon monoxide in the gas being vented to a flare drops below a predetermined value, say 10 ppmv, the valve 41 in the stripping nitrogen line 40 is closed. Weigh cells 47 and its recorder 48 are provided on the stripper vessel for measuring and recording the gross weight after it has stabilized.

The stripper vessel 30 is then isolated from the flare line by closing valve 44. The fly ash discharge valve 42 is then opened, allowing the fly ash to drop into a storage silo 50. The silo 50 is provided with a discharge line 51 having a valve 52 therein. A nitrogen supply line 53, having a valve 54 therein, is provided for introducing nitrogen into the bottom of the silo 50 to aid in discharging the fly ash. At this point, the about 300° F, passes via line 14 to temperature of the fly ash may be 200° F.

Any disposal or desired use of the fly ash may be made and such use is not part of this invention. The drawing illustrates one possible method of handling where the fly ash is dropped from the silo 50 into a pug mill 55 with water being added through a line 56 to wet it down to prevent dust emissions during further handling. The wet paste of fly ash and water from the pug mill may be emptied into a transit mixer or cement truck 57. Cement is added to this mixture to densify the fly ash and make it more suitable for utilization or disposal.

An automated control system is used in carrying out the fly ash collection and stripping sequences of the present invention, due to the complexity of the operation and the large number of steps which must be performed, some simultaneously and some in rapid succession. A programmable logic controller confirms when the vessel 22 has been emptied and isolated from the stripper 30. If desired, some stripping operations may take place in the lock hopper using nitrogen flow after the lock hopper has been depressurized.

Figure 2:
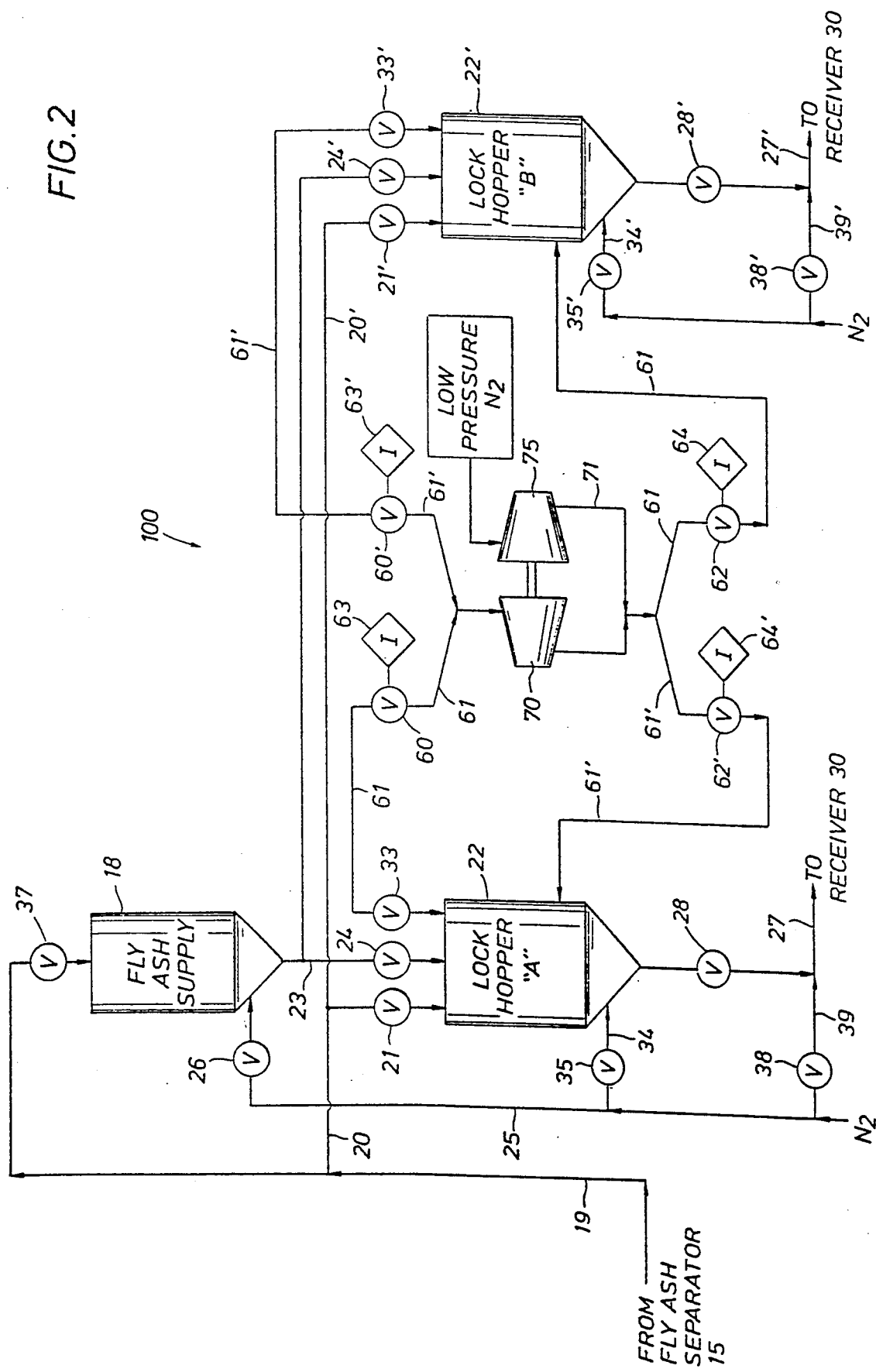
FIG. 2 is a schematic flow diagram of the main components of the process equipment to be used to carry out the method of the present invention.

The prior art apparatus and process described above requires a waste of energy when the high pressure lock hopper is vented to the atmosphere. The improvement of FIG. 2 utilizes a large part of this energy to perform further useful work in the process. The portion of the equipment 100 shown by the dotted lines of prior art FIG. 1 is replaced by that of FIG. 2 designated generally at 100 which shows dual lock hoppers "A" and "B" designated by numerals 22 and 22'. (Corresponding elements associated with lock hopper "B" are designated by a "prime" e.g., 22 .) The process is the same as in the prior art process of FIG. 1 up to the venting to atmosphere of a lock hopper. In the instant improvement vent valves 33 and 33' remain open throughout the entire operation. When one lock hopper 22 is filled (high pressure, ready for emptying) and the other 22' is empty (low pressure, ready for repressurizing and filling), all valves to both lock hoppers are closed. Valves 60 and 62 are then opened by HIGH SELECT computer interlock circuit 63 and LOW SELECT interlock circuit 64, respectively, allowing the high pressure in lock hopper 22 to equalize with, and partially pressurize, the empty lock hopper 22' through conduit 61. After equalization, valves 60 and 62 are closed and valve 28 is opened to permit transfer of fly ash to receiver/stripper 30 as before. In traversing conduit 61 through valves 60 and 62, the high pressure fluid from lock hopper 22 is forced through a pressure recovery device such as a turboexpander, a combination turboexpander/blower set or a venturi eductor 70. The energy recovered thereby is used, preferably to compress additional gas in compressor 75 to assist in the simultaneous pressurization of lock hopper 22'. Compressor 75 is supplied with gas from a low pressure nitrogen source, or other exhaust nitrogen, and its compressed output is fed through conduit 71 and back into conduit 61. The combination of 70, 75 is thus used to convert kinetic energy from high pressure conduit 61 to pressure energy in conduit 71 which is used to pressurize lock hopper 22' at a slightly higher pressure than otherwise would be attainable. Upon partial pressurization of lock hopper 22' in this manner, and emptying of lock hopper 22 through line 27, the system is ready for reversing the process with the other lock hopper 22' its complete pressurization and filling. Thus with lock hopper 22' filled and at high pressure and with all valves closed (except vent valves 33 and 33'), valves 60' and 62' are opened by HIGH SELECT interlock circuit 63' and LOW SELECT interlock circuit 64' respectively and high pressure fluid flows from lock hopper 22' through conduit 61' and through the pressure recovery device 70 and the process is repeated as explained above. In this manner, up to 40% of the kinetic energy is recoverable during pressure let down. The process is then continued per the prior art process of FIG. 1 for further treatment and disposal of the fly ash.

Figure 3:
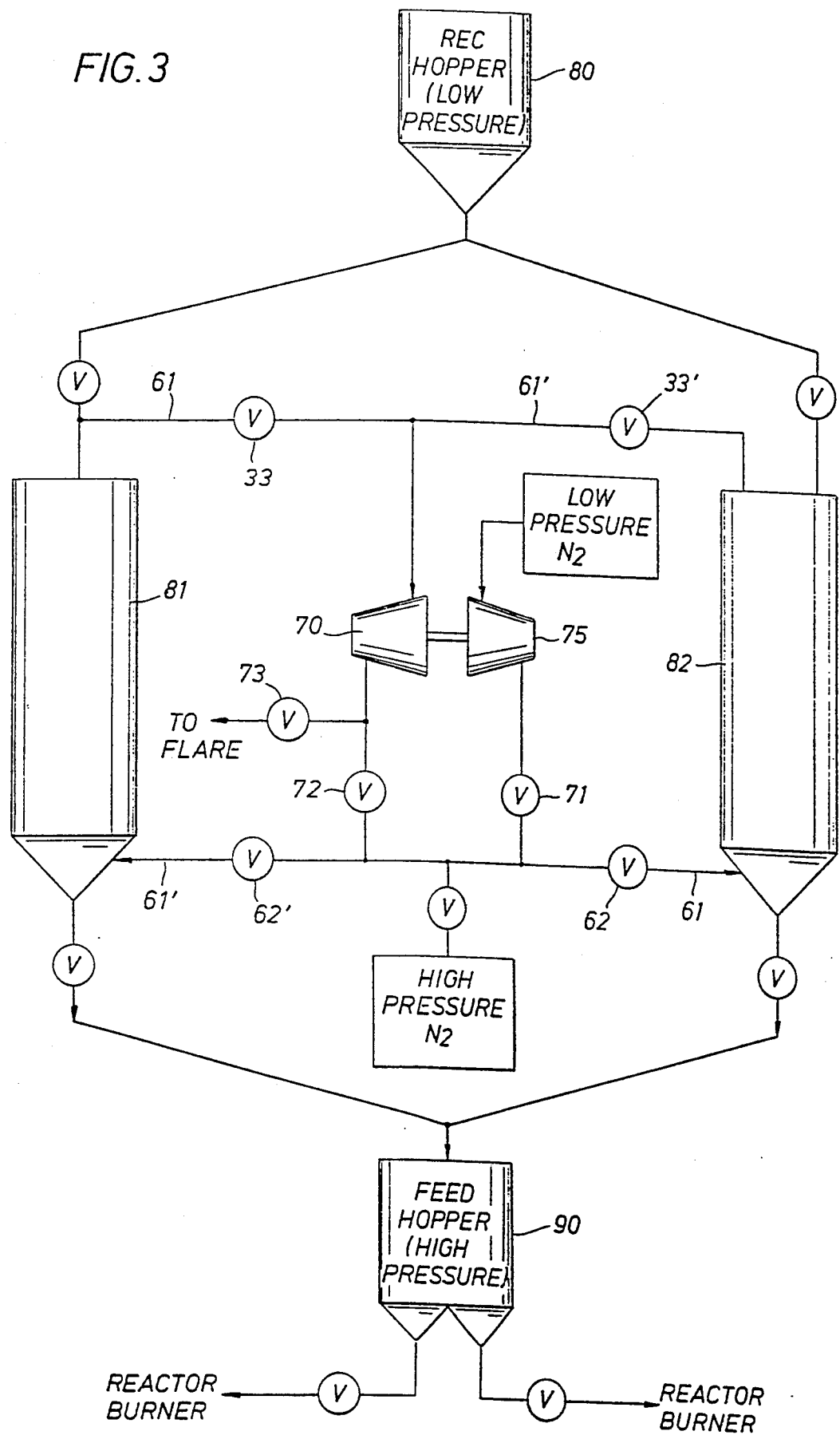
FIG. 3 is a schematic flow diagram of a preferred embodiment of the present invention.

While the invention has been described with particular reference to a fly ash disposal configuration, the disclosed enhanced pressurization system may be used for various purposes where dual lock hoppers are used. In an alternate preferred embodiment, for example, the enhanced pressure lines 61 and 61' may instead be routed to the feed hopper 90, as shown in FIG. 3, to provide additional pressure for fluidizing and controlling the flow of the particulate coal to the feed hopper 90 and thence to burners 2 of the gasifier 3. In this embodiment, a low pressure coal-receiving hopper 80 in each coal-receiving train supplies coal to a single, multiple outlet, high pressure feed hopper 90 through parallel trains of lock hoppers 81, 82. Each coal feed train has two lock hoppers, 81, 82 which are alternately filled at low pressure by receiving hopper 80. High pressure nitrogen is introduced into the lock hoppers sequentially in order to pressurize the hopper and the coal therein is then discharged to the high pressure feed hopper 90. To conserve the high pressure nitrogen, i.e., to conserve energy, lock hoppers 81, 82 are operated alternately so that when one lock hopper depressurizes, the gas from that lock hopper is used to partially pressurize the other lock hopper. So initially, for example, lock hopper 81 might be fully pressurized and loaded with coal while lock hopper 82 is empty and completely depressurized i.e., at atmospheric pressure. Then lock hopper 81 will vent through valve 33 in line 61 and the gas is introduced into the bottom of lock hopper 82 through line 61 in order to partially pressurize lock hopper 82. In the operating mode, assume lock hopper 81 starts at high pressure, say 455-500 psig. After depressurizing (equalizing), lock hoppers 81 and 82 each would end up at half that, say 225 psig. The total gas contained in the system does not change during the equalization process, it just goes from a high level of exergy to a lower level of exergy; in other words it is evenly divided between the two lock hoppers. The difference in what is called exergy, or available energy from the initial difference in pressure of the two lock hoppers, is utilized, by discharging lock hopper 81 and expanding it through a turbo compressor 70, 75 into lock hopper 82. The "equalizing" gas is forced through the expander turbine or turbo compressor 70, 75 and the energy recovered thereby is used to pull in additional nitrogen from a relatively low pressure nitrogen source and pump it into the combined lock hopper system. Thus, by using the energy, i.e. the flow energy or exergy from the high pressure nitrogen flowing from lock hopper 81 to lock hopper 82 additional gas is drawn into the system. When the system is fully equilibrated in this manner, instead of having 225 psig each in lock hoppers 81 and 82 as stated above it is possible to pressurize to 250, 260 or even 300 psig in the lock hoppers and therefore save that amount of high pressure nitrogen ($\Delta N_2$) required to pressure lock hopper 82 up from 225 to 300 psig. The cost in order to do that is very small because the turbo compressor is a small piece of mechanical equipment. A number of interlock valves are used to control the flow of nitrogen in this cycle as is known to those skilled in the art. After equalization, the high pressure nitrogen source may be used to bring lock hopper 82 to high pressure. Lock hopper 81 then is still at 225 or 300 psig, (it is at the higher pressure if the turbo compressor is used to boost the pressure in the whole system). By reconnecting the discharge from the turbo compressor to a low pressure destination (such as a flare) additional energy can be recovered for pumping in nitrogen from the low pressure nitrogen source and it continues to recover the energy from this lock hopper.

Once lock hoppers 81 and 82 are at equilibrium, the interlock valve 72 connecting the vent side (the expansion side of the turbo compressor,) is blocked off from the pressurization connection 62, 62' and is reconnected to a low pressure destination such as a flare system through valve 73. Venting of lock hopper 81 is continued through the turbo expander to the low pressure destination instead of to the lock hopper 82. We continue to use that expansion energy to pump the low pressure nitrogen up to the high pressure nitrogen level to continue to pressurize lock hopper 82 and then, if necessary, augment that with the high pressure nitrogen source. The vent from either of the lock hoppers, although it is filtered, may contain some volatiles from the coal or it also may contain some very fine coal particles so it is filtered or sent through the flare system in order to prevent any environmental impact. It is advantageous to vent one lock hopper as much as possible through the other lock hopper because that also recovers some of the coal material that is in it.

A similar application or way to recover energy from the flow of gas from one lock hopper to another which would not use rotating machinery is to use a venturi eductor in which one lock hopper is vented through the venturi eductor to the other lock hopper and the venturi eductor is used to suck in some additional nitrogen. However, this will work only on the high pressure part of the cycle where you are equilibrating gas between the two lock hoppers. It will not work when venting to low pressure through valve 73. With the turbo compressor, once equilibrium is obtained, the depressurization cycle of lock hopper 81, i.e. the originally high pressure lock hopper, is continued through valve 73 to the flare. If a venturi is used, then you quickly run out of the capability to pump up the pressure as much as needed to get into the lock hopper 82 which is pressuring up. This is true because venturies are limited in the pressure ratio that they can achieve. The turbo compressor has the advantage that the expansion side and the compression side can be isolated from each other.

What is claimed is:

1. A process for the production of synthesis gas wherein coal is partially oxidized at an elevated temperature and pressure by feeding finely divided coal and oxygen through a feed line to a gasification zone of a reactor, comprising the steps of:

providing a first and second pressure-isolatable chamber, said first chamber being at a lower pressure than said second chamber, each of said chambers having a solids inlet, a solids outlet and a pressure vent line, into which chambers a selected mass of particulate coal may be selectively received at essentially atmospheric pressure conditions from a low pressure storage point and selectively and alternatingly discharged therefrom at high pressure to a high pressure feed hopper wherein said first and second chambers are selectively placed in fluid communication with each other for pressure equalization therebetween, and wherein each of said vent lines is selectively and alternately placed in fluid communication with a common line between said first and second chambers and with a pressure recovery means located in said common line;

transferring a selected first mass of said particulate coal under atmospheric pressure conditions to said first pressure-isolatable chamber with its outlet closed;

selectively isolating said first chamber from said low pressure storage point by closing said chamber inlet after said selected first mass of particulate coal has been transferred thereto;

partially pressurizing said first chamber by depressurizing said second chamber through said pressure recovery means and said common line to said first chamber;

generating additional pressure energy by said pressure recovery means and further pressurizing said first chamber therewith;

isolating said first chamber and pressurizing it to said high pressure; and transferring said first coal mass to said feed hopper.

2. The process of claim 1 further comprising the steps of:

partially depressurizing said first chamber to said second chamber said second chamber being filled with a second coal mass;

finally depressurizing said first chamber to atmospheric pressure through said pressure recovery means thereby driving said pressure recovery means;

generating additional pressure energy by said pressure recovery means; and supplying said additional pressure energy to said second chamber.

3. The process of claim 1 wherein said pressure recovery means is a venturi eductor.

4. The process of claim 1 wherein said pressure recovery means is a turbo expander.

5. The process of claim 1 wherein said pressure recovery means is a turbo-compressor.

* * * * *